(12) United States Patent
Yan et al.

(10) Patent No.: US 12,340,449 B2
(45) Date of Patent: Jun. 24, 2025

(54) METHOD AND SYSTEM FOR GENERATING RANDOM GRAPHIC TRAINING DATASET AND HOLOGRAM

(71) Applicant: Army Academy of Armored Forces of PLA, Beijing (CN)

(72) Inventors: Xingpeng Yan, Beijing (CN); Xinlei Liu, Beijing (CN); Xi Wang, Beijing (CN); Tao Jing, Beijing (CN); Xiaoyu Jiang, Beijing (CN); Zhuo Chen, Beijing (CN); Cheng Song, Beijing (CN)

(73) Assignee: Army Academy of Armored Forces of PLA, Beijing (CN)

( * ) Notice: Subject to any disclaimer, the term of this patent is extended or adjusted under 35 U.S.C. 154(b) by 183 days.

(21) Appl. No.: 18/201,487

(22) Filed: May 24, 2023

(65) Prior Publication Data
US 2024/0054705 A1 Feb. 15, 2024

(30) Foreign Application Priority Data
Aug. 10, 2022 (CN) .......................... 202210953313.3

(51) Int. Cl.
G06T 11/60 (2006.01)
G06N 3/08 (2023.01)
G06T 11/40 (2006.01)

(52) U.S. Cl.
CPC ................ G06T 11/60 (2013.01); G06N 3/08 (2013.01); G06T 11/40 (2013.01)

(58) Field of Classification Search
CPC ........... G06T 11/60; G06T 11/40; G06N 3/08; G06N 3/045; G06N 3/047; G06N 3/084; G06V 10/744; G06V 10/82
See application file for complete search history.

(56) References Cited

U.S. PATENT DOCUMENTS

| | | | |
|---|---|---|---|
| 2005/0206653 A1* | 9/2005 | Beaumont | G06T 11/40 345/629 |
| 2018/0181846 A1* | 6/2018 | Koziarz | G06F 3/1248 |

(Continued)

OTHER PUBLICATIONS

Liang Shi, et al., "Towards real-time photorealistic 3D holography with deep neural networks", Nature, vol. 591, Mar. 10, 2021, pp. 234-253 (Year: 2021).*

(Continued)

Primary Examiner — Jin Cheng Wang
(74) Attorney, Agent, or Firm — Procopio, Cory, Hargreaves & Savitch LLP

(57) ABSTRACT

A method and system for generating a random graphic training dataset and a hologram is disclosed, which relates to the technical field of image processing. The method for generating a random graphic training dataset includes: randomly generating a plurality of graphic datasets, where each of the graphic datasets includes a square, a circle and an equilateral triangle; for any graphic dataset, performing gradual filling on each graphic in the graphic dataset to obtain a gradual graphic dataset; and performing translation transformation on each graphic in the gradual graphic dataset for a predetermined number of times to obtain random graphics corresponding to the graphic dataset, and determining random graphics corresponding to all graphic datasets as a random graphic training dataset. More comprehensive training data can be provided and a training effect of a model can be improved.

4 Claims, 3 Drawing Sheets

(56) References Cited

U.S. PATENT DOCUMENTS

| | | | |
|---|---|---|---|
| 2019/0377854 A1* | 12/2019 | Mehedy | G06F 3/0488 |
| 2021/0042965 A1* | 2/2021 | Phogat | G06V 10/763 |
| 2022/0414913 A1* | 12/2022 | Baek | G06T 7/596 |
| 2023/0171385 A1* | 6/2023 | Chakravarthula | G03H 1/2205 348/40 |
| 2023/0205133 A1* | 6/2023 | Matusik | G03H 1/04 359/9 |
| 2024/0184242 A1* | 6/2024 | Matusik | G06N 3/045 |

OTHER PUBLICATIONS

Lee et al. "Deep neural network for multi-depth hologram generation and its training strategy", vol. 28, No. 18, Aug. 31, 2020, Optics Express, pp. 27137-27154 (Year: 2020).*

Y. Ishii, et al. "Optimization of phase-only holograms calculated with scaled diffraction calculation through deep neural networks", Applied Physics B, Jan. 15, 2022, vol. 128, No. 22, pp. 1-11 (Year: 2022).*

Z. Hao, et al., "Characterization Method for Particle Extraction from Raw-Reconstructed Images Using U-Net", Frontiers in Physics, published Feb. 1, 2022, vol. 9, Article 816158, pp. 1-8 (Year: 2022).*

X. Sun, et al., "Dual-task convolutional neural network based on the combination of the U-Net and a diffraction propagation model for phase hologram design with suppressed speckle noise", Optics Express, vol. 30, No. 2, Jan. 17, 2022, pp. 2646-2658 (Year: 2022).*

Makowski, et al., "Digital hologram transformations for RGB color holographic display with independent image magnification and translation in 3D", Applied Optics, vol. 57, No. 1, Jan. 1, 2018, pp. A76-A85 (Year: 2018).*

* cited by examiner

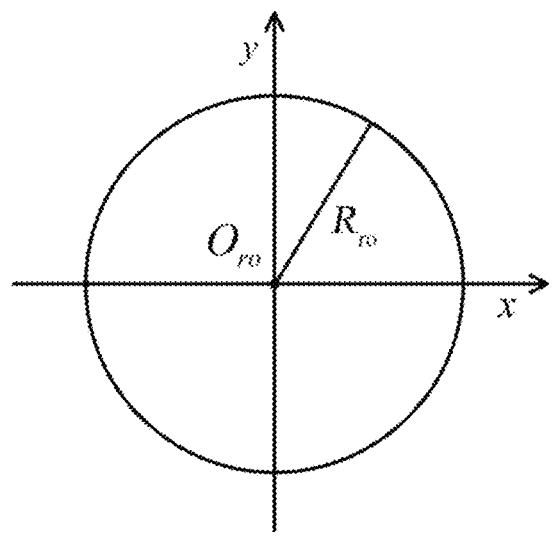
FIG. 4
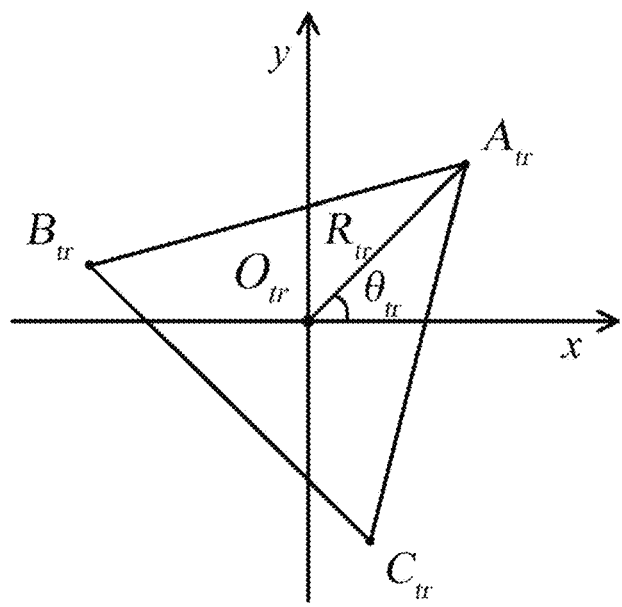
FIG. 5
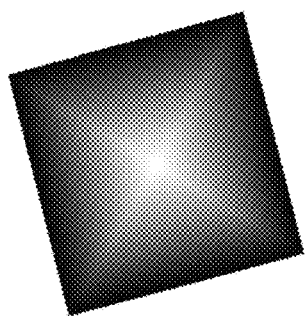 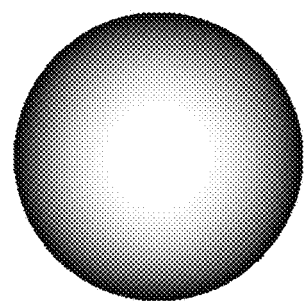 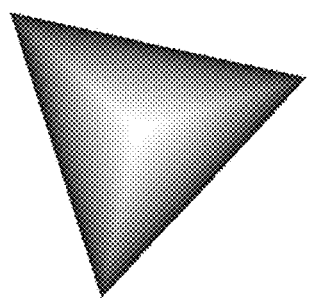
FIG. 6A      FIG. 6B      FIG. 6C

METHOD AND SYSTEM FOR GENERATING RANDOM GRAPHIC TRAINING DATASET AND HOLOGRAM

CROSS-REFERENCE TO RELATED APPLICATION

This patent application claims the benefit and priority of Chinese Patent Application No. 202210953313.3 filed with the China National Intellectual Property Administration on Aug. 10, 2022, the disclosure of which is incorporated by reference herein in its entirety as part of the present application.

TECHNICAL FIELD

The present disclosure relates to the technical field of image processing, in particular to a method and system for generating a random graphic training dataset and a hologram.

BACKGROUND

In recent years, research and application in the field of images have been widely concerned by people, for example realizing common functions such as facial recognition payment, clocking in at work and product classification by researching image recognition, improving diagnostic efficiency of medical diseases and promoting the development of unmanned driving by researching semantic segmentation, and realizing naked-eye real 3D stereoscopic display effect by researching computational holography.

With advancement of hardware technology and substantial increase in computing power of computing platforms, researchers are increasingly inclined to use a neural network to solve the above-mentioned common problems in the image field. When the neural network model is trained, a large amount of data datasets are required as its input. A suitable training dataset is extremely important for training of the network model, and in order to approach performance limit of the network model and achieve better training effect, training datasets used in model training should be as rich and comprehensive as possible. Common image training datasets include ImageNet, CIFAR, AFLW and INRIA Person Dataset, which however have limited data, and thus is impossible to provide all possible training data, resulting in a poor effect of a hologram obtained by a trained network model. Therefore, it is extremely important for neural network training to provide a method that can provide more comprehensive training data.

SUMMARY

An objective of some embodiments of the present disclosure is to provide a method and system for generating a random graphic training dataset and a hologram, which can provide more comprehensive training data and improve a training effect of a model.

In order to achieve the above-mentioned objective, the present disclosure provides the following solutions.

A method for generating a random graphic training dataset, including:

randomly generating a plurality of graphic datasets, where each of the graphic datasets includes a square, a circle and an equilateral triangle;

for any graphic dataset, perform gradual filling on each graphic in the graphic dataset to obtain a gradual graphic dataset;

Perform translation transformation on each graphic in the gradual graphic dataset for a predetermined number of times to obtain random graphics corresponding to the graphic dataset, and determining random graphics corresponding to all graphic datasets as a random graphic training dataset.

Optionally, the performing gradual filling on each graphic in the graphic dataset to obtain a gradual graphic dataset specifically includes:

for any graphic in the graphic dataset, determining a to-be-filled pixel value at each point in the graphic according to a distance from each point in the graphic to a center of the graphic, to obtain a gradual graphic corresponding to the graphic;

determining gradual graphic corresponding to various graphics in the graphic dataset to form a gradual graphic dataset.

Optionally, the determining a to-be-filled pixel value at each point in the graphic according to a distance from each point in the graphic to a center of the graphic to obtain a gradual graphic corresponding to the graphic specifically includes:

for any point inside the graphic, calculating a to-be-filled pixel value of the point according to a formula $$p = \left(\frac{L_{OU}}{\max(L_{OU})}\right)^{\delta},$$

where p is the to-be-filled pixel value of the point, $L_{OU}$ is a distance from the point to the center of the graphic, $\max(L_{OU})$ is a maximum of distances from all points inside the graphic to the center of the graphic, and $\delta$ is a gradual index of a gray value.

A system for generating a random graphic training dataset, includes:

a graphic dataset generation module, configured to randomly generate a plurality of graphic datasets, where each of the graphic datasets includes a square, a circle and an equilateral triangle;

a gradual module, configured to, for any graphic dataset, perform gradual filling on each graphic in the graphic dataset to obtain a gradual graphic dataset; and a random graphic training dataset generation module configured to perform translation transformation on each graphic in the gradual graphic dataset for a predetermined number of times to obtain random graphics corresponding to the graphic dataset, and determine random graphics corresponding to all graphic datasets as a random graphic training dataset.

Optionally, the gradual module specifically includes:

a gradual graphic generation unit, configured to, for any graphic in the graphic dataset, determine a to-be-filled pixel value at each point in the graphic according to a distance from each point in the graphic to a center of the graphic to obtain a gradual graphic corresponding to the graphic; and a gradual graphic dataset generation unit, configured to determine gradual graphics corresponding to various graphics in the graphic dataset to form a gradual graphic dataset.

Optionally, the gradual graphic generation unit specifically includes:

a gradual graphic generation subunit, configured to, for any point inside the graphic, calculate a to-be-filled pixel value of the point according to a formula $$p = \left(\frac{L_{OU}}{\max(L_{OU})}\right)^{\delta},$$

where p is the to-be-filled pixel value of the point, $L_{OU}$ is a distance from the point to the center of the graphic, max ($L_{OU}$) is a maximum of distances from all points inside the graphic to the center of the graphic, and $\delta$ is a gradual index of a gray value.

A method for generating a hologram, includes:
calculating a diffraction field of a random graphic training dataset, where the random graphic training dataset is generated by the above method for generating a random graphic training dataset;
generating a phase-only hologram of the random graphic training dataset;
training a fully convolutional neural network with the diffraction field as an input and the phase-only hologram as an output to obtain a trained fully convolutional neural network;
acquiring a preprocessed image;
calculating a diffraction field of the preprocessed image; and
inputting the diffraction field of the preprocessed image into the trained fully convolutional neural network to obtain a hologram of the preprocessed image.

A system for generating a hologram, includes:
a training diffraction field calculation module, configured to calculate a diffraction field of a random graphic training dataset, where the random graphic training dataset is generated by using the above method;
a phase-only hologram generation module, configured to generate a phase-only hologram of the random graphic training dataset;
a training module, configured to train a fully convolutional neural network with the diffraction field as an input and the phase-only hologram as an output to obtain a trained fully convolutional neural network;
an acquisition module, configured to acquire a preprocessed image; and
a diffraction field calculation module, configured to calculate a diffraction field of the preprocessed image;
where the diffraction field of the preprocessed image is input into the trained fully convolutional neural network to obtain a hologram of the preprocessed image.

According to specific embodiments of the present disclosure, the present disclosure discloses the following technical effects. In the present disclosure, a pixel value of a point inside a graphic is calculated according to a distance from the point to a center of the graphic, so as to realize a gradual effect of the graphic, and then a required random graphic training dataset can be obtained through translation and transformation. The random graphic training dataset has more detailed information such as angles and edges and background information about pixel value graduals. Compared with traditional training datasets, the random graphic training dataset contains more image information, and the distribution of high frequency components and low frequency components in the spectrum is also more balanced, which can provide more comprehensive training data and improve the training effect of the model.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description are merely some embodiments of the present disclosure, and those of ordinary skill in the art may still derive other drawings from these drawings without creative efforts.

FIG. 4 is a schematic diagram of a randomly generated circle;

FIG. 5 is a schematic diagram of a randomly generated equilateral triangle;

FIGS. 6A-6C is a schematic diagram of a gradual graphic dataset;

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

In order to make the above-mentioned objective, features, and advantages of the present disclosure more apparent and more comprehensible, the present disclosure is further described in detail below with reference to the drawings and specific embodiments.

Figure 1:
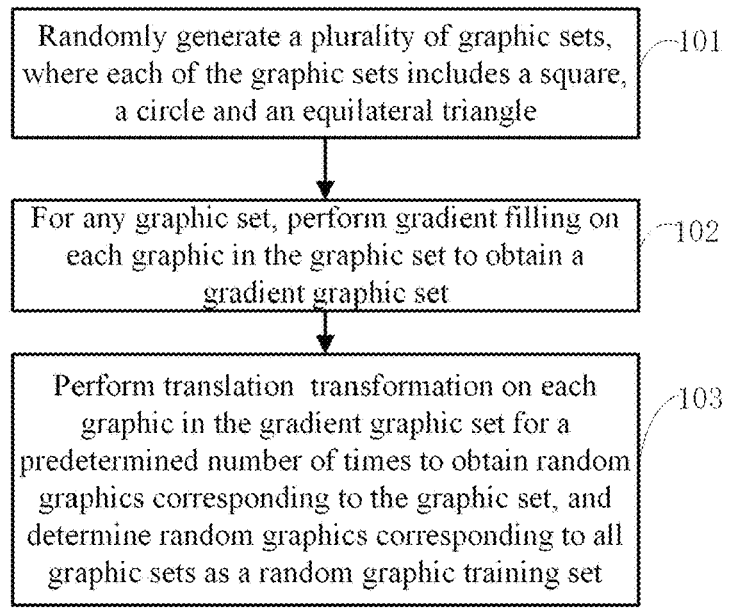
FIG. 1 is a flow chart of a method for generating a random graphic training dataset according to an embodiment of the present disclosure.

An embodiment of the present disclosure provides a method for generating a random graphic training dataset. As shown in FIG. 1, the method includes the following steps 101-103.

In step 101, a plurality of graphic datasets is randomly generated, where each of the graphic datasets includes a square, a circle and an equilateral triangle.

In step 102, for any graphic dataset, each graphic in the graphic dataset is subjected to gradual filling to obtain a gradual graphic dataset.

Figure 2:
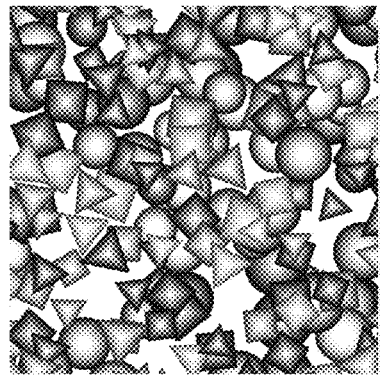
FIG. 2 is a schematic diagram of random graphics.

In step 103, each graphic in the gradual graphic dataset is subjected to translation transformation for a predetermined number of times, to obtain random graphics corresponding to the graphic dataset, and random graphics corresponding to all graphic datasets are determined as a random graphic training dataset. As shown in FIG. 2, specifically, different coordinate points are randomly selected as centers, and random graphics can be generated through translation transformation.

In practical application, step 101 specifically includes the following steps 1-3.

In step 1, a square with a random position, a random size and a random inclination angle is generated.

Figure 3:
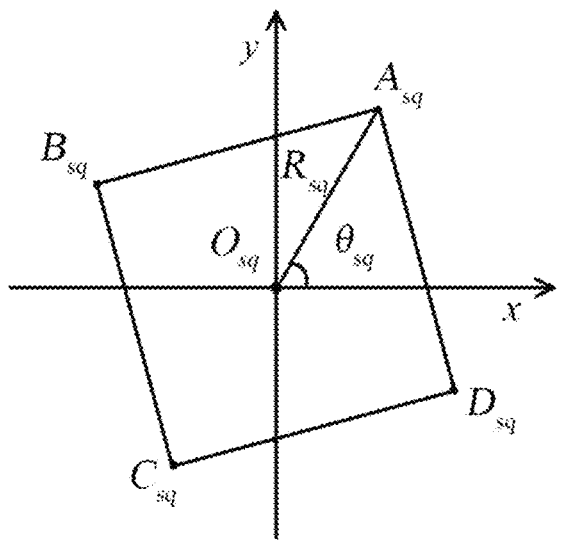
FIG. 3 is a schematic diagram of a randomly generated square.

As shown in FIG. 3, a plane rectangular coordinate system is established with a center $O_{sq}$ of the square as an origin. Values of $R_{sq}$ and $\theta_{sq}$ are randomly dataset as a distance between a vertex and the center of the square, and an angle between a line segment from the center to a vertex $A_{sq}$ and a positive direction of x axis of the coordinate system.

The coordinates of four vertices of the square $A_{sq}(x_{A_{sq}}, y_{A_{sq}})$, $B_{sq}(x_{B_{sq}}, y_{B_{sq}})$, $C_{sq}(x_{C_{sq}}, y_{C_{sq}})$, $D_{sq}(x_{D_{sq}}, y_{D_{sq}})$ can be respectively expressed as $$\begin{cases} A_{sq} = (R_{sq}\cos(\theta_{sq}), R_{squ}\sin(\theta_{sq})) \\ B_{sq} = (R_{sq}\cos(\theta_{sq}+\pi/2), R_{sq}\sin(\theta_{sq}+\pi/2)) \\ C_{sq} = (R_{sq}\cos(\theta_{sq}+\pi), R_{sq}\sin(\theta_{sq}+\pi)) \\ D_{sq} = (R_{sq}\cos(\theta_{sq}+3\pi/2), R_{sq}\sin(\theta_{sq}+3\pi/2)) \end{cases} \quad (1)$$

From formula (1), it can be seen that distances $L_{A_{sq}B_{sq}}$, $L_{B_{sq}C_{sq}}$, $L_{C_{sq}D_{sq}}$, $L_{A_{sq}D_{sq}}$ from any point S(x,y) in a plane where the coordinate system is located to straight lines where four sides of the square are located are:

$$\begin{cases} L_{A_{sq}B_{sq}} = \dfrac{|(y_{B_{sq}}-y_{A_{sq}})x+(x_{A_{sq}}-x_{B_{sq}})y+(x_{B_{sq}}y_{A_{sq}}-x_{A_{sq}}y_{B_{sq}})|}{\sqrt{(y_{B_{sq}}-y_{A_{sq}})^2+(x_{A_{sq}}-x_{B_{sq}})^2}} \\ L_{B_{sq}C_{sq}} = \dfrac{|(y_{C_{sq}}-y_{B_{sq}})x+(x_{B_{sq}}-x_{C_{sq}})y+(x_{C_{sq}}y_{B_{sq}}-x_{B_{sq}}y_{C_{sq}})|}{\sqrt{(y_{C_{sq}}-y_{B_{sq}})^2+(x_{B_{sq}}-x_{C_{sq}})^2}} \\ L_{C_{sq}D_{sq}} = \dfrac{|(y_{D_{sq}}-y_{C_{sq}})x+(x_{C_{sq}}-x_{D_{sq}})y+(x_{D_{sq}}y_{C_{sq}}-x_{C_{sq}}y_{D_{sq}})|}{\sqrt{(y_{D_{sq}}-y_{C_{sq}})^2+(x_{C_{sq}}-x_{D_{sq}})^2}} \\ L_{A_{sq}D_{sq}} = \dfrac{|(y_{A_{sq}}-y_{D_{sq}})x+(x_{D_{sq}}-x_{A_{sq}})y+(x_{A_{sq}}y_{D_{sq}}-x_{D_{sq}}y_{A_{sq}})|}{\sqrt{(y_{A_{sq}}-y_{D_{sq}})^2+(x_{D_{sq}}-x_{A_{sq}})^2}} \end{cases} \quad (2)$$

Distances from a point inside the square to the four sides should be less than or equal to a side length of the square, so any point S(x, y) located inside the square meets the following condition:

$$\max(L_{A_{sq}B_{sq}}, L_{B_{sq}C_{sq}}, L_{C_{sq}D_{sq}}, L_{A_{sq}D_{sq}}) \leq \sqrt{2}R_{sq}. \quad (3)$$

Pixels which do not meet the condition in formula (3) are filtered out, and a shape formed by remaining pixels is a square with a random position, a random size and a random inclination angle.

In step 2, a circle with a random position and a random size is generated.

As shown in FIG. 4, a plane rectangular coordinate system is established with a center $O_{ro}$ of the circle as an origin, and a value of $R_{ro}$ is randomly dataset as a radius of the circle.

A distance $L_{O_{ro}Q}$ from any point Q(x, y) in a plane where the coordinate system is located to the center of the circle is $$L_{O_{ro}Q} = \sqrt{x^2+y^2}. \quad (4)$$

A distance from a point inside the circle to the center of the circle should be less than or equal to the radius of the circle, so any point Q(x, y) located inside the circle meets the following condition:

$$L_{O_{ro}Q} \leq R_{ro}. \quad (5)$$

Pixels which do not meet the condition in formula (5) are filtered out, and a shape formed by remaining pixels is a circle with a random position and a random size.

In step 3, an equilateral triangle with a random position, a random size and a random inclination angle is generated.

As shown in FIG. 5, a plane rectangular coordinate system is established with a center of the equilateral triangle as an origin. Values of $R_{tr}$ and $\theta_{tr}$ are randomly dataset as a distance between a vertex and the center of the equilateral triangle, and an angle between a line segment from the center to the vertex Air and a positive direction of x axis of the coordinate system.

The coordinates of three vertices of the equilateral triangle $A_{tr}(x_{A_{tr}}, y_{A_{tr}})$ $B_{tr}(x_{B_{tr}}, y_{B_{tr}})$, $C_{tr}(x_{C_{tr}}, y_{C_{tr}})$ can be expressed as:

$$\begin{cases} A_{tr} = (R_{tr}\cos(\theta_{tr}), R_{tr}\sin(\theta_{tr})) \\ B_{tr} = (R_{tr}\cos(\theta_{tr}+2\pi/3), R_{tr}\sin(\theta_{tr}+2\pi/3)) \\ C_{tr} = (R_{tr}\cos(\theta_{tr}+4\pi/3), R_{tr}\sin(\theta_{tr}+4\pi/3)) \end{cases} \quad (6)$$

Vectors from any point W(x, y) in a plane where the coordinate system is located to the three vertices of the equilateral triangle are:

$$\begin{cases} \overrightarrow{WA_{tr}} = (x_{A_{tr}}-x, y_{A_{tr}}-y) \\ \overrightarrow{WB_{tr}} = (x_{B_{tr}}-x, y_{B_{tr}}-y), \\ \overrightarrow{WC_{tr}} = (x_{C_{tr}}-x, y_{C_{tr}}-y) \end{cases} \quad (7)$$

so vector products corresponding to the three vectors are:

$$\begin{cases} \overrightarrow{WA_{tr}} \times \overrightarrow{WB_{tr}} = (x_{A_{tr}}-x)(y_{B_{tr}}-y)-(x_{B_{tr}}-x)(y_{A_{tr}}-y) \\ \overrightarrow{WB_{tr}} \times \overrightarrow{WC_{tr}} = (x_{B_{tr}}-x)(y_{C_{tr}}-y)-(x_{C_{tr}}-x)(y_{B_{tr}}-y) \\ \overrightarrow{WC_{tr}} \times \overrightarrow{WA_{tr}} = (x_{C_{tr}}-x)(y_{A_{tr}}-y)-(x_{A_{tr}}-x)(y_{C_{tr}}-y) \end{cases} \quad (8)$$

According to directions of the vector products, when the following conditions are met at the same time:

$$\overrightarrow{WA_{tr}} \times \overrightarrow{WB_{tr}} \geq 0 \,\&\, \overrightarrow{WB_{tr}} \times \overrightarrow{WC_{tr}} \geq 0 \,\&\, \overrightarrow{WC_{tr}} \times \overrightarrow{WA_{tr}} \geq 0, \quad (9)$$

W(x, y) is located in the equilateral triangle.

Pixels which do not meet the conditions in formula (9) are filtered out, and a shape formed by remaining pixels is an equilateral triangle with a random position, a random size and a random inclination angle.

In practical application, step 102 specifically includes:

for any graphic in the graphic dataset, determining a pixel value to be filled at each point in the graphic according to a distance from each point in the graphic to a center of the graphic, to obtain a gradual graphic corresponding to the graphic.

Gradual graphics corresponding to various graphics in the graphic dataset are determined to form a gradual graphic dataset.

In practical application, the determining a pixel value to be filled at each point in the graphic according to a distance from each point in the graphic to the center of the graphic to obtain a gradual graphic corresponding to the graphic, specifically includes as follows.

For any point inside the graphic, a pixel value of the point to be filled is calculated according to formula:

$$p = \left(\frac{L_{OU}}{\max(L_{OU})}\right)^\delta, \quad (10)$$

where p is the pixel value to be filled of the point, $L_{OU}$ is a distance from the point to the center of the graphic, max ($L_{OU}$) is a maximum of distances from all points inside the graphic to the center of the graphic, and δ is a gradual index of a gray value. The pixel value of the point is calculated according to a ratio of the distance from an internal point to the center of the graphic to the distance from a furthest internal point to the center of the graphic; By changing the parameter δ(δ>0), curve shape can be adjusted to control an overall gradual effect of the graphic. As shown in FIGS. 6A-6C, the gradual effect in FIG. 6B is a circular gradation. $L_{OU}$ is set to be a distance from an internal point to a nearest edge, which can achieve parallel gradual effect as shown in FIG. 6A and FIG. 6B.

In practical application, a distance from a point U(x, y) inside a random graphic to the center of the graphic is:

$$L_{OU} = \sqrt{x^2 + y^2} \quad (11)$$

A system for generating a random graphic training dataset includes a graphic dataset generation module, a gradual module and a random graphic training dataset generation module.

The graphic dataset generation module is configured to randomly generate a plurality of graphic datasets, where each of the graphic datasets includes a square, a circle and an equilateral triangle.

The gradual module is configured to, for any graphic dataset, perform gradual filling on each graphic in the graphic dataset to obtain a gradual graphic dataset.

The random graphic training dataset generation module is configured to perform translation transformation on each graphic in the gradual graphic dataset for a dataset number of times, to obtain random graphics corresponding to the graphic dataset, and determine random graphics corresponding to all graphic datasets as a random graphic training dataset.

In practical application, the gradual module specifically includes a gradual graphic generation unit and a gradual graphic dataset generation unit.

The gradual graphic generation unit is configured to, for any graphic in the graphic dataset, determine a pixel value to be filled at each point in the graphic according to a distance from each point in the graphic to the center of the graphic, to obtain a gradual graphic corresponding to the graphic.

The gradual graphic dataset generation unit is configured to determine gradual graphics corresponding to various graphics in the graphic dataset to form a gradual graphic dataset.

In practical application, the gradual graphic generation unit specifically includes a gradual graphic generation subunit.

The gradual graphic generation subunit is configured to calculate a pixel value of the point to be filled according to the formula (10), for any point inside the graphic.

A method for generating a hologram includes the following steps.

Figure 7:
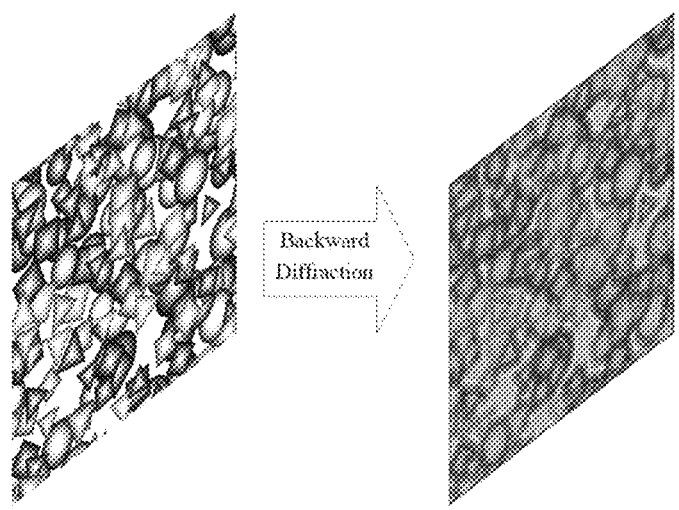
FIG. 7 is a schematic diagram of a Backward Diffraction process.

First, a diffraction field of a random graphic training dataset is calculated, and the calculation result is shown in FIG. 7. The random graphic training dataset is generated according to the method for generating the random graphic training dataset described above.

Subsequently, a phase-only hologram of the random graphic training dataset is generated.

Then, a fully convolutional neural network is trained with the diffraction field as an input and the phase-only hologram as an output to obtain a trained fully convolutional neural network.

Next, a preprocessed image is acquired.

Next, a diffraction field of the preprocessed image is calculated.

Finally, the diffraction field of the preprocessed image is input into the trained fully convolutional neural network to obtain a hologram of the preprocessed image.

Figure 8:
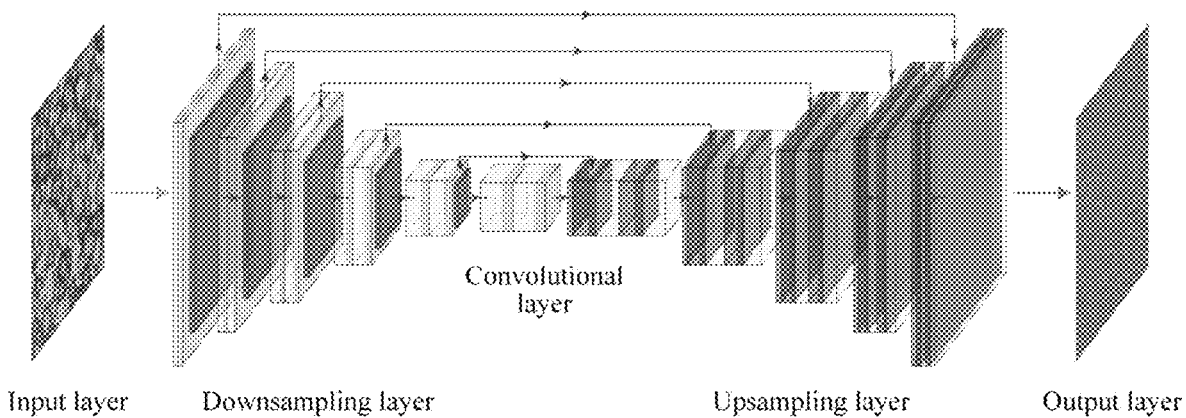
FIG. 8 is a schematic diagram of a hologram generation process.

As shown in FIG. 8, the fully convolutional neural network adopts a U-net architecture and is provided with 1 input layer, 5 downsampling layers, 1 convolutional layer, 5 upsampling layers, and 1 output layer, and involves 32 features. Its loss function adopts perceptual loss function and L1 loss function (average absolute value error). With the model trained by the random graphic training dataset, high-quality holograms can be generated quickly.

In practical application, the calculating the diffraction field of the random graphic training dataset is specifically described as follows.

A backpropagation distance of the random graphic training dataset is z, a diffraction field on the diffraction surface is $$U(x,y) = F^{-1}\{F\{U_0(x,y)\} \cdot H(f_x, f_y)\}, \quad (12)$$

where $\mathcal{F}\{\}$ is a two-dimensional Fourier transform, $\mathcal{F}^{-1}\{\}$ is a two-dimensional inverse Fourier transform, $U_0(x, y)$ is a complex amplitude of the training dataset in a monochromatic light field, and $H(f_x, f_y)$ is an optical transfer function, $$H(f_x, f_y) = \exp\left\{j \cdot z \cdot 2\pi \sqrt{\frac{1}{\lambda^2} - (f_x)^2 - (f_y)^2}\right\}, \quad (13)$$

where exp is an exponential function with a natural constant e as a base, j is an imaginary number, λ is a wavelength of monochromatic light, $f_x$ and $f_y$ are spatial frequencies of the diffraction field in x axis and y axis directions, respectively.

A system for generating a hologram includes a training diffraction field calculation module, a phase-only hologram generation module, a training module, an acquisition module, and a diffraction field calculation module.

The training diffraction field calculation module is configured to calculate a diffraction field of a random graphic training dataset. The random graphic training dataset is generated according to the method for generating the random graphic training dataset described above.

The phase-only hologram generation module is configured to generate a phase-only hologram of the random graphic training dataset.

The training module is configured to train a fully convolutional neural network with the diffraction field as an input and the phase-only hologram as an output to obtain a trained fully convolutional neural network.

The acquisition module is configured to obtain a preprocessed image.

The diffraction field calculation module is configured to calculate a diffraction field of the preprocessed image.

The diffraction field of the preprocessed image is input into the trained fully convolutional neural network to obtain a hologram of the preprocessed image.

The present disclosure has the following advantages.

1. The present disclosure proposes a method for generating a random graphic training dataset, which is consisted of basic random graphics (random squares, random circles and random equilateral triangles). First, according to mathematical properties and decision theorems of three basic random graphics, generated basic graphics are allowed to have random positions, sizes and inclination angles by numerical calculation software. Then, a pixel value of a point inside the graphic is calculated according to a distance from the point to a center of the graphic, so as to realize a gradual effect of a graphic. Finally, a number of basic graphics is set, and the required random graphic training dataset can be obtained through translation transformation. The frequency spectrum of this random graphic training dataset is close to that of real images, and thus the random graphic training dataset can be substituted for the real images in image recognition, semantic segmentation, computer-generated hologram, and other neural network model-based research directions that have a greater demand for image datasets.

2. The generation method is convenient. Commonly used datasets (such as DIV2K, Flickr2K, etc.) are huge in size, and are prone to error in transmission via network, resulting in corruption of transmitted files. Further, when 3DS MAX, Blender and other software are used for sampling, a large number of 3D models need to be prepared in advance, and such operation process is complicated, and requests researchers having high software skills. Compared with the above traditional methods for obtaining datasets, the method for generating a random graphic training dataset of the present disclosure can quickly generate a large number of different training images in a relatively short period of time by using numerical calculation software, and has extremely high acquisition efficiency.

3. It is suitable for multiple directions. When the research direction changes, it is often necessary to replace with a new training dataset. In the method of the present disclosure, the position, size and inclination angle of the basic random graphic are controllable, so different random graphic training datasets can be generated according to different research needs. Compared with traditional methods, the method of the present disclosure has strong adaptability and can be used in many different research directions.

4. Image information is rich. The random graphic training dataset has more detailed information such as angles and edges and background information about pixel value gradation. Compared with the traditional training dataset, the random graphic training dataset contains richer image information, and is more balanced in the distribution of high frequency components and low frequency components within the spectrum.

Each embodiment in this specification is described in a progressive manner, and focuses on differences from other embodiments. The same and similar parts of these embodiment can be referred to each other. As for a system disclosed in an embodiment, since it corresponds to a method disclosed in another embodiment, the description of the system is relatively simple, and for the related information, reference can be made to the description of the method.

In this specification, specific examples have been used to illustrate the principle and implementation of the present disclosure. The description of the above embodiments is only used to help understand the method of the present disclosure and its core idea. In addition, for those of ordinary skill in the art, according to the idea of the present disclosure, there will be changes in specific implementations and application ranges. In summary, the contents of this specification should not be construed as limiting the present disclosure.

What is claimed is:

1. A method for generating a random graphic training dataset, comprising:
randomly generating a plurality of graphic datasets, wherein each of the graphic datasets comprises a square, a circle and an equilateral triangle;
for any graphic dataset, performing gradual filling on each graphic in the graphic dataset to obtain a gradual graphic dataset, which further comprises:
for any graphic in the graphic dataset, determining a to-be-filled pixel value at each point in the graphic according to a distance from each point in the graphic to a center of the graphic, to obtain a gradual graphic corresponding to the graphic, which further comprises:
for any point inside the graphic, calculating a to-be-filled pixel value be point according to a formula $$p = \left(\frac{L_{OU}}{\max(L_{OU})}\right)^\delta,$$

wherein p is the to-be-filled pixel value of the point, $L_{OU}$ is a distance from the point to the center of the graphic, $\max(L_{OU})$ is a maximum of distances from all points inside the graphic to the center of the graphic, and $\delta$ is a gradual index of a gray value; and
performing translation transformation on each graphic in the gradual graphic dataset for a predetermined number of times to obtain random graphics corresponding to the graphic dataset, and determining random graphics corresponding to all graphic datasets as a random graphic training dataset.

2. A method for generating a hologram, comprising:
calculating a diffraction field of a random graphic training dataset, wherein the random graphic training dataset is generated by using the method according to claim 1;
generating a phase-only hologram of the random graphic training dataset;
training a fully convolutional neural network with the diffraction field as an input and the phase-only hologram as an output to obtain a trained fully convolutional neural network;
acquiring a preprocessed image;
calculating a diffraction field of the preprocessed image; and
inputting the diffraction field of the preprocessed image into the trained fully convolutional neural network to obtain a hologram of the preprocessed image.

3. A system for generating a hologram, comprising:
a processor; and
a memory having program instructions stored,
wherein when the processor executes the program instructions stored on the memory, the processor is configured to:
calculate a diffraction field of a random graphic training dataset, wherein the random graphic training dataset is generated by using the method according to claim 1;
generate a phase-only hologram of the random graphic training dataset;

train a fully convolutional neural network with the diffraction field as an input and the phase-only hologram as an output to obtain a trained fully convolutional neural network;

acquire a preprocessed image;

calculate a diffraction field of the preprocessed image;

input the diffraction field of the preprocessed image into the trained fully convolutional neural network to obtain a hologram of the preprocessed image.

4. A system for generating a random graphic training dataset, comprising:

a processor; and a memory having program instructions stored, wherein when the processor executes the program instructions stored on the memory, the processor is configured to:

randomly generate a plurality of graphic datasets, wherein each of the graphic datasets comprises a square, a circle and an equilateral triangle;

for any graphic dataset, perform gradual filling on each graphic in the graphic dataset to obtain a gradual graphic dataset, wherein for any graphic in the graphic dataset, the processor is further configured to determine a to-be-filled pixel value at each point in the graphic according to a distance from each point in the graphic to a center of the graphic, to obtain a gradual graphic corresponding to the graphic, wherein, for any point inside the graphic, the processor is further configured to calculate a to-be-filled pixel value of the point according to a formula $$p = \left(\frac{L_{OU}}{\max(L_{OU})}\right)^{\delta},$$

wherein p is the to-be-filled pixel value of the point, $L_{OU}$ is a distance from the point to the center of the graphic, $\max(L_{OU})$ is a maximum of distances from all points inside the graphic to the center of the graphic, and $\delta$ is a gradual index of a gray value; and perform translation transformation on each graphic in the gradual graphic dataset for a predetermined number of times to obtain random graphics corresponding to the graphic dataset, and determine random graphics corresponding to all graphic datasets as a random graphic training dataset.

* * * * *